United States Patent
Hoijtink et al.

(10) Patent No.: US 8,915,988 B2
(45) Date of Patent: Dec. 23, 2014

(54) METHOD FOR SEPARATING A MEDIUM MIXTURE INTO FRACTIONS

(75) Inventors: Reinoud Hoijtink, Vissoie (CH); Melissa Hoijtink, legal representative, Amsterdam (NL); Jozef Johannes Hubertus Brouwers, Lanaken (BE); Thomas Brunner, Graz (AT)

(73) Assignee: Romico Hold A.V.V., Oranjestad, Aruba (NL)

( * ) Notice: Subject to any disclaimer, the term of this patent is extended or adjusted under 35 U.S.C. 154(b) by 335 days.

(21) Appl. No.: 13/260,797

(22) PCT Filed: Mar. 24, 2010

(86) PCT No.: PCT/NL2010/000053
§ 371 (c)(1),
(2), (4) Date: Nov. 29, 2011

(87) PCT Pub. No.: WO2010/114362
PCT Pub. Date: Oct. 7, 2010

(65) Prior Publication Data
US 2012/0103189 A1     May 3, 2012

(30) Foreign Application Priority Data
Mar. 31, 2009   (NL) ..................................... 2002691

(51) Int. Cl.
*B01D 53/24*   (2006.01)
*B01D 53/00*   (2006.01)
*C10L 3/10*    (2006.01)

(52) U.S. Cl.
CPC .......... *B01D 53/002* (2013.01); *B01D 2258/06* (2013.01); *B01D 53/24* (2013.01); *C10L 3/10* (2013.01); *B01D 2257/504* (2013.01); *C10L 3/102* (2013.01); *B01D 2257/7022* (2013.01)
USPC .......... 95/34; 95/35; 95/261; 95/270; 96/216; 5/406

(58) Field of Classification Search
CPC ...... B01D 53/002; B01D 53/24; C10L 3/102; C10L 3/10
USPC .......... 55/338, 338.1, 339, 467, 467.1; 95/31, 95/34, 35, 39, 40, 41, 42, 249, 259, 261, 95/266, 267, 269, 270, 271, 272; 96/155, 96/204, 205, 206, 208, 215, 216, 218
See application file for complete search history.

(56) References Cited

U.S. PATENT DOCUMENTS 4,135,898 A * 1/1979 Rosengard ...................... 55/419
4,801,310 A * 1/1989 Bielefeldt ...................... 210/788
(Continued)

FOREIGN PATENT DOCUMENTS

EP   286160 A1 * 10/1988 ............. B01D 45/14
NL   1026299 C1   12/2005
(Continued)

*Primary Examiner* — Duane Smith
*Assistant Examiner* — Sonji Turner
(74) *Attorney, Agent, or Firm* — The Webb Law Firm, P.C.

(57) ABSTRACT

The invention relates to a device for separating a flowing medium mixture into at least two fractions with differing mass density. The device comprises an inlet for the medium mixture to be separated, which connects to first separating means for separating the flowing mixture in at least a first and a second fraction, and that connect to first and second outlet means for discharging the first and second fractions. The device further comprises a feedback loop comprising second separating means between the second outlet means and the inlet means of the first separating means. The invention also relates to a method for separating a flowing medium mixture into at least two fractions with differing mass density, using the claimed device. The device and method allow to obtain a more selective separation, particularly in purifying natural gas.

19 Claims, 2 Drawing Sheets

(56) References Cited

U.S. PATENT DOCUMENTS

| | | | |
|---|---|---|---|
| 5,133,190 A * | 7/1992 | Abdelmalek | 60/648 |
| 7,550,032 B2 * | 6/2009 | Brouwers et al. | 95/141 |
| 8,128,732 B2 * | 3/2012 | Hoijtink et al. | 95/35 |
| 2006/0225386 A1 * | 10/2006 | Brouwers et al. | 55/319 |
| 2007/0227186 A1 * | 10/2007 | Alferov et al. | 62/620 |
| 2008/0257788 A1 * | 10/2008 | Leito | 209/44 |
| 2009/0031756 A1 * | 2/2009 | Betting et al. | 62/620 |
| 2009/0301296 A1 * | 12/2009 | Hoijtink et al. | 95/35 |
| 2010/0037771 A1 * | 2/2010 | Christensen et al. | 95/35 |
| 2011/0036122 A1 * | 2/2011 | Betting et al. | 62/636 |

FOREIGN PATENT DOCUMENTS

| | | |
|---|---|---|
| WO | 2005/118110 A1 | 12/2005 |
| WO | 2006/032139 A1 | 3/2006 |
| WO | 2006/087332 A1 | 8/2006 |
| WO | 2006/089948 A1 | 8/2006 |
| WO | 2007/097621 A1 | 8/2007 |
| WO | 2009/002174 A2 | 12/2008 |

* cited by examiner

METHOD FOR SEPARATING A MEDIUM MIXTURE INTO FRACTIONS

BACKGROUND OF THE INVENTION

1) Field of the Invention

The invention relates to a device for separating a flowing medium mixture into at least two fractions with differing mass density, comprising separating means for separating the flowing mixture into fractions. The invention also relates to a method for separating a flowing medium mixture into fractions with differing mass density.

2) Description of the Prior Art

The separation of a (flowing) medium mixture has many diverse applications. A medium mixture is here understood to mean a mixture of solid and/or liquid and/or gas particles of micron or submicron size dispersed in at least one liquid or gas. Examples are a gas/gas mixture, a gas/liquid mixture or aerosol, a liquid/liquid mixture, a gas/solid mixture, a liquid/solid mixture, or such a mixture provided with one or more additional fractions. The separation of a medium mixture is for instance known from various applications of liquid cleaning, (flue) gas cleaning and powder separation. Separation of fractions with a great difference in particle size and/or a great difference in mass density is relatively simple. Large-scale use is made for this purpose of processes such as filtration and screening. In the separation of fractions with a smaller difference in mass density, as is for instance the case for gas/gas mixtures, use is made of physical or chemical absorption techniques and/or separating techniques such as sedimentation and centrifugation. Certainly when processing large volumes of medium mixtures, chemical separating techniques are less economical and usually also less environmentally friendly. Separating fractions by means of sedimentation requires time and, when processing larger volumes of medium mixture, makes it necessary to make use of voluminous reservoirs, which is, among other things, expensive.

A known device is described in NL1026299. The known device comprises separating means in the form of a rotating assembly of feed channels for rotating the flowing mixture for separating, a feed for the medium mixture to be separated connecting to the rotating means, and outlets connecting to the rotating means for discharging the fractions of the separated medium mixture. In a rotating feed channel the heavier fraction of the mixture for separating is moved further outward towards the wall thereof than the lighter fraction under the influence of the centrifugal force, thus resulting in a separation. Separation selectivity and efficiency however can be improved further.

The present invention has for its object to provide a device and method capable of providing an increased selectivity for the fractions to be separated.

SUMMARY OF THE INVENTION

The invention provides for this purpose a device for separating a flowing medium mixture into at least two fractions with differing mass density. The device comprises an inlet for the medium mixture to be separated, which connects to first separating means for separating the flowing mixture in at least a first and a second fraction, and that connect to first and second outlet means for discharging the first and second fractions, and is characterized in that the device further comprises a feedback loop comprising second separating means between the second outlet means and the inlet means of the first separating means.

According to the present invention the separation efficiency of the known device is increased by providing the device with second separating means that connect to an outlet of the first separating means, and reconnect to the inlet thereof.

According to the invention, the device comprises an inlet for the medium mixture to be separated, which connects to first treatment means, at least comprising first rotating means for rotating the flowing mixture such that it separates in at least a first and a second fraction, and that connect to first and second outlet means for discharging the first and second fractions, wherein the device further comprises second treatment means that connect downstream in the medium flow direction to the second outlet means, and at least comprise second rotating means for rotating the second fraction such that it separates in at least a third and fourth fraction, and that connect to third and fourth outlet means for discharging the third and fourth fractions, the third outlet means reconnecting to the inlet of the first treatment means and/or first rotating means.

In a preferred embodiment, the device according to the invention comprises a first means for physically influencing the differences in mass densities of the fractions to be separated. The first means connects upstream in the medium flow direction to the first separating means. In another preferred embodiment, the device further comprises a second means for physically influencing the differences in mass densities of the fractions to be separated. The second means connects downstream in the medium flow direction to the first separating means and upstream in the medium flow direction to the second separating means.

The separation efficiency of the separating means is increased further according to these preferred embodiments by influencing the mass density of at least a part of the mixture before the medium reaches the separating means such that the differences in mass densities of the fractions to be separated are preferably increased. Increasing the difference in mass densities of the fractions to be separated can for instance take place by changing the temperature (heating or cooling subject to circumstances) of the mixture. It is thus simpler to separate the fractions from each other by means of rotation (as a result of the increased difference in centripetal forces exerted on the fraction). It is noted here that the separation of the fractions is understood to mean at least partial separation of two fractions such that a significant difference in the average mass density of the two fractions results; a complete (100%) separation will be difficult to realize in practice. In the preferred case in which the separating means comprise rotating means, and as a consequence of the rotation of the mixture, now with increased differences in the mass densities of the fractions to be separated, the lighter fraction will migrate at least substantially to the inner side of the rotation and the heavier fraction will migrate at least substantially to the outer side of the rotation. This is a separation which increases the possible uses of at least one of the fractions compared to the mixture. Usually, after separation, this usable fraction (in a purification process this will be the "cleaned" fraction) may still comprise a part of another undesired fraction (in a purification process this will be the "contaminated" fraction), although the presence of this other undesired fraction will be significantly smaller than the presence of it in the original mixture. Conversely, the undesired ("contaminated") fraction may still after treatment in the first separating means comprise a part of the usable ("cleaned") fraction. In case the second fraction corresponds to the undesired fraction of the medium mixture, and by providing the second separating means in accordance with the invention, the presence of the usable fraction in the undesired fraction is reduced further, which therefore increases the separation efficiency and selectivity. An additional advantage of the invented device is that it can be given a compact form. Moreover, treatment times are generally short.

It should be noted that the invention is by no means limited to the type of separator used, and many kinds of separator can be used. In a preferred embodiment, the first and/or second separating means comprise a rotating assembly of feed channels. Such rotating separators have the advantage that the average distance of a medium particle to a wall (in radial direction) is limited, whereby a desired degree of separation can be achieved in a relatively short time (which corresponds to a relatively limited length of the rotating separator in axial direction). The operation of such a rotating assembly of feed channels is further positively influenced if a laminar flow of the medium is maintained in the channels. Conversely, it is also possible for the medium to be carried through the channels with turbulent flow. The flow speeds to be applied can be varied or optimized according to the situation.

In yet another preferred embodiment, the first and/or second separating means comprise a cyclone. The separating means can also be supplemented by at least one cyclone (vortex), or alternatively by an assembly of a plurality of cyclones. In the case of a cyclone it is possible to give the separating means a stationary form and to set only the medium into rotation. The application of a plurality of (smaller) cyclones has an advantage relative to a single cyclone which is comparable to the advantage of a rotating assembly of feed channels. Baffles can optionally be placed in a cyclone, for instance for the purpose of causing a determined fraction to condense on the baffles and for controlling the cyclone.

In yet another preferred embodiment, the means influencing mass density comprise active or passive cooling and/or heating means. These cooling means can be deployed directly to increase the mass density of the fractions for separating. In a particularly advantageous application, the cooling means are disposed upstream of the expansion means in the direction of flow of the medium for the first separating means, the second separating means, or both. The mixture is thus first cooled down before the expansion begins and then reaches a much lower temperature level as a result of the expansion, thereby creating extra options for separating the fractions. This can be a very advantageous solution energetically, for instance if the (pre-)cooling can take place by dissipation into the environment. This will be further elucidated herein below on the basis of further developed examples.

The invention also relates to a method for separating a flowing medium mixture into at least two fractions with differing mass density. The invented method advantageously uses the device described herein and comprises the steps of:
A) supplying a medium mixture to be separated in fractions,
B) treating the flowing medium mixture in first separating means, such that it separates in at least a first and a second fraction,
C) discharging at least the first and the second fraction,
D) treating the second fraction in second rotating means, such that it separates in at least a third and a fourth fraction,
E) discharging at least the third and the fourth fraction,
F) supplying the fourth fraction to the first separating means, and
G) repeating at least steps B) and C).

As already stated above, it is advantageous that step B) comprises physically increasing the differences in the mass densities of the fractions to be separated in the medium mixture, prior to causing separation thereof, and even more preferably when step D) comprises physically increasing the differences in mass densities of the fractions to be separated in the second fraction, prior to causing separation thereof.

Preferably, separation of the flowing medium mixture and/or of the second fraction is carried out by causing rotation of the flowing medium mixture and/or of the second fraction in rotating means. The method according to the invention preferably involves causing rotation of the flowing medium mixture and/or the second fraction in a rotating assembly of feed channels. Such rotary separators have the advantage that the average distance of the medium from a wall (in radial direction) is limited, whereby a desired degree of separation can be achieved in a relatively short time (which corresponds to a relatively limited length of the rotary separator in axial direction). The operation of such a rotating assembly of feed channels is further influenced positively if a preferably laminar flow of the medium is maintained in the channels. Conversely, it is also possible for the medium to be carried through the channels with turbulent flow.

In another preferred embodiment of the method, the flowing medium mixture and/or second fraction is caused to rotate in a cyclone (vortex), or alternatively by an assembly of a plurality of cyclones. In the case of a cyclone it is possible to give the rotating means a stationary form and to set only the medium into rotation. The application of a plurality of (smaller) cyclones has an advantage relative to a single cyclone which is comparable to the advantage of a rotating assembly of feed channels. Baffles can optionally be placed in a cyclone, for instance for the purpose of causing a determined fraction to condense on the baffles and for controlling the cyclone.

Preferably, the method according to the invention is further characterized in that the difference in mass densities of the fractions of the mixture for separating and/or of the second fraction is increased by causing the mixture to expand and/or by cooling; whereby, cooling is most preferably performed before expansion.

The expansion can be performed according to the invention by any known expansion means suitable for the purpose. By means of expansion, the temperature of a medium can be decreased within a very short period of time. Expansion is preferably realized by applying an expansion cooler of the "Joule-Thomson" type. The medium mixture is cooled isenthalpically in such an expansion cooler, whereby the pressure can be decreased relatively independently of the temperature. Another option is that the cooling is brought about by a cooling medium, which is for instance expanded in a separate circulation system so as to bring it to the desired low temperature level. The expansion is preferably performed isentropically (or adiabatically) using a turbine. In such a cooling pressure and temperature are decreased together. The advantage of working with a separate cooling medium, compared to expansion of the medium for separating, is for instance that this separate cooling medium can be optimized for the desired cooling action. As already stated above, the temperature decrease is responsible for affecting the densities of the fractions. Particularly favorable effects can be achieved if the mixture consists of fractions with the same phase (for instance a gas/gas mixture or a liquid/liquid mixture), at least one fraction of which undergoes a phase change due to the temperature change such that the phases of the fractions for separating differ from each other (whereby for instance a gas/liquid mixture, a gas/solid mixture or a liquid/solid mixture results). This phenomenon of phase change of a substance as a result of temperature change is of course a generally known phenomenon. The present invention is however based on the realization that a very advantageous separation becomes possible when combining a phase change (or in any case change in the difference in mass density of fractions for separating) and subsequent subjecting of the medium mixture to a first separation, preferably rotation, combined with the described feedback loop, comprising second separation, preferably rotation of at least a fraction of the medium mixture.

It is however expressly noted that for the separation by means of the rotating means, it is not necessary to create a phase difference between the components for separating; the device is equally applicable to a mixture of fractions which are in the same phase (for instance liquid/liquid mixtures such as a dispersed liquid and gas/gas mixtures). For the best possible operation it is desirable here to have the mass densities of the fractions for separating differ as much as possible.

A (p, T) diagram of the medium mixture (a diagram of the pressure against the temperature) is generally characterized by a range where the fractions of the medium mixture form one phase (the mixing range) and a more or less closed range where at least a part of the fractions form a distinct phase (demixing range). A gaseous range, a liquid range and a solid range are generally further distinguished, wherein the gaseous range is located on average at the higher temperatures and the solid range, conversely, at low pressure and temperature. A number of lines demarcate these ranges, in particular a liquid line which indicates the boundary between combinations of pressure and temperature under which (in addition to other phases) a liquid phase also occurs, and a solid line which indicates the boundary between combinations of pressure and temperature under which (in addition to other phases) a solid phase also occurs. According to this preferred embodiment, the target point is relatively close to the intersection of the solid and liquid lines.

A particularly preferred method according to the invention is characterized in that treatment of the medium mixture in step B) comprises bringing the medium mixture to a pressure (P) and a temperature (T), which together define a target point in the (P,T) diagram of the medium mixture, with the proviso that the target point is below the liquid line of the phase diagram and relatively close to the intersection between the solid and the liquid line. By cooling and expanding the medium mixture to reach the target point defined above before bringing the medium mixture in rotation in the first rotating means, the selectivity of separation is maximized. A drawback however may be that the second fraction possibly comprises an increased amount of the first fraction, which may be undesirable. This problem is adequately solved by providing the treatment in the second separating means, which preferably comprises causing rotation of the second fraction and re-feeding an output thereof to the first separating means. Surprisingly, by applying both measures, a higher selectivity for at least one of the fractions for separating is achieved compared to the known method. In other words, the said at least one fraction is separated in purer form; wherein, the fractions desired in the purified medium mixture remain present in a greater measure. A medium mixture is more particularly obtained and can be separated into purer fractions than has heretofore been the case. Each fraction may generally contain less of another fraction.

According to this preferred embodiment, the target point should be relatively close to the intersection between the solid and the liquid line. With relatively close is meant that the target point does not deviate more than 50° C. and 20 bar from the intersection between the solid and the liquid line, more preferably not more than 40° C. and 15 bar from the intersection, and most preferably not more than 30° C. and 10 bar from the intersection.

In a preferred embodiment, the target point is on the right of the solid line. The medium mixture before actual separation will then comprise a liquid and a gaseous phase. The second fraction will in this embodiment comprise a liquid phase, wherein a gaseous phase is dissolved. This second fraction is easily separated in the second separating means in a third, mainly liquid fraction that is re-fed to the first separating means to rejoin the original flowing medium mixture, and a fourth, mainly gaseous fraction that is discharged.

In another preferred embodiment, the target point is on the left of the solid line. The medium mixture before actual separation will then comprise a liquid, a solid and a gaseous phase. The second fraction will in this embodiment comprise a liquid phase, wherein solids and a gaseous phase is dissolved. This second fraction is easily separated in the second separating means in a third, mainly solid/liquid fraction (a slurry) that is re-fed to the first separating means to rejoin the original flowing medium mixture, and a fourth, mainly gaseous fraction that is discharged. It is advantageous to limit the amount of solids to provide a slurry that can be transported easily through ducts and the like, for instance by a pump.

The decrease in temperature to the target point can for instance be obtained by feeding the medium mixture to active or passive cooling means. Although not essential to the invention, it is advantageous when the temperature is decreased at almost constant pressure. Because the temperature is reduced from room temperature for most medium mixtures, the medium mixture as a whole will undergo a phase separation. Some examples of possible applications of the present invention are the separation of an air/nitrogen mixture, a $CO_2$/nitrogen mixture, a $CO_2/H_2$ mixture, de-aerating or degassing of water, dehydrating of air and the cleaning of natural gas. The method is preferably applied for the purpose of separating gas/gas mixtures, such as for instance natural gas, into fractions. The temperature decrease to the target point will in this case result in a phase change from the gaseous state to the liquid state. By first re-cooling the medium mixture before beginning the expansion in order to then reach an even much lower final temperature (and final pressure) as a result of the expansion, at least one of the fractions for separating will undergo a phase change from liquid to gas, in this case the most volatile fractions. This results in a medium mixture with a liquid matrix incorporating gas bubbles, in other words a bubbled structure. It has been found that such a mixture can be separated with enhanced selectivity, wherein the selectivity is higher than the selectivity which can be achieved by a method wherein the gas mixture is expanded from the gaseous phase.

The method according to the invention can be performed with a relatively small through-flow device since the separate processing steps can be carried out within a very short period of time, for instance individually in less than 1 second, usually in less than 0.1 second or even in less than 10 or less than 5 milliseconds. This makes lengthy processes, with associated devices which are dimensioned such that they can contain large volumes, unnecessary.

A particular preferred application of the method according to the invention is characterized in that the medium mixture comprises natural gas, and that the target point is chosen such that the methane fraction present in the natural gas mixture changes to the gaseous (or vapour) phase. When selecting the target point such that it is below the liquid line of the phase diagram and relatively close to the intersection between the solid and the liquid line, the methane vapour fraction in the liquid/gas mixture is maximized.

This methane fraction is discharged as first fraction, whereby the typical concentration is between 86 mol % and 96 mol % of methane.

According to another preferred embodiment the target point is chosen such that at least one of the contaminating fractions present in the medium mixture, such as for instance $CO_2$ and $H_2S$, changes phase, which (second) fraction is at least partly separated from the methane fraction in the first rotating means, and then subjected to rotation in the second rotating means to at least partly separate the $CO_2/H_2S$ (fourth) fraction from the methane (third) fraction, which methane (third) fraction is then re-fed to the first rotating means.

The reserves of natural gas which can be recovered in economically cost-effective manner are limited since a significant part of the technically recoverable natural gas is contaminated with unwanted gases. Certainly when they occur in the natural gas in tens of percents, it has heretofore not been possible to separate these contaminating gases to a sufficient extent from the hydrocarbons in economically cost-effective manner. The method according to the invention does not have this drawback.

BRIEF DESCRIPTION OF THE DRAWINGS

The present invention will be further elucidated on the basis of the non-limitative exemplary embodiments shown in the following figures. Herein.

DETAILED DESCRIPTION OF THE PREFERRED EMBODIMENTS

Figure 2:
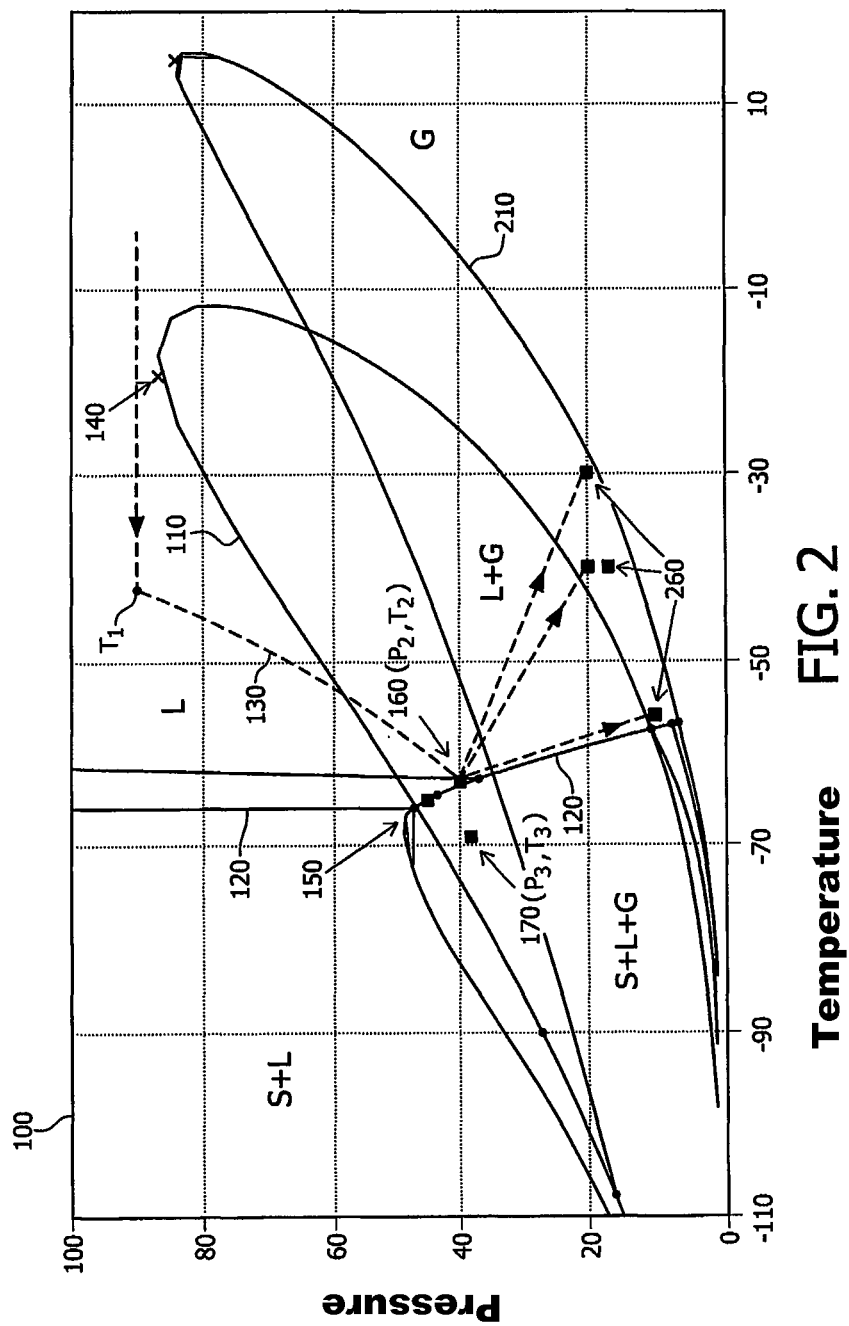
FIG. 2 shows an example of a (P, T) diagram of a natural gas mixture to be separated with the method according to the invention.

FIG. 2 shows a phase diagram of a contaminated gas such as for instance natural gas which can be cleaned with the invented method. This is more particularly the phase diagram of a $CH_4/CO_2/H_2S$ mixture. The y-axis shows the pressure 100, while the temperature 200 is shown along the x-axis. The phase diagram further comprises a range (designated with G or L) where the fractions of the medium mixture form one phase (the mixing range) and a more or less closed range (designated with G+L, L+S and G+L+S) where at least a part of the fractions form a distinct phase (demixing range). In range G the medium mixture is gaseous, in range L the medium mixture is liquid. In range G+L a mixture is present of liquid and gas, wherein in the present case $CO_2$ and $H_2S$ are in the liquid phase and $CH_4$ in the gaseous phase. Present in range G+L+S is a mixture of gas, liquid and solid, more particularly $CH_4$ being in the gas phase, $H_2S$ in the liquid phase and $CO_2$ in the solid phase. Although not indicated in FIG. 2, it is also possible for $H_2S$ to change to the solid phase when the temperature falls further. A number of lines demarcate the relevant ranges, in particular a dew point or liquid line 110 which indicates the boundary between combinations of pressure 100 and temperature 200 below which (in addition to other phases) a liquid phase L also occurs, and a solid line 120 which indicates the boundary between combinations of pressure 100 and temperature 200 below which (in addition to other phases) a solid phase S also occurs. The phase diagram shows a critical point 140, a concept generally known to the skilled person, at which the gaseous phase and liquid phase are in equilibrium with each other. It will be apparent that the phase diagram shown in FIG. 2 is given only by way of example, and that the method is likewise applicable for separating medium mixtures with more fractions, and therefore a more complicated phase diagram. A point 150 is defined as the intersection between the solid line 120 and the liquid line 110.

Figure 1:
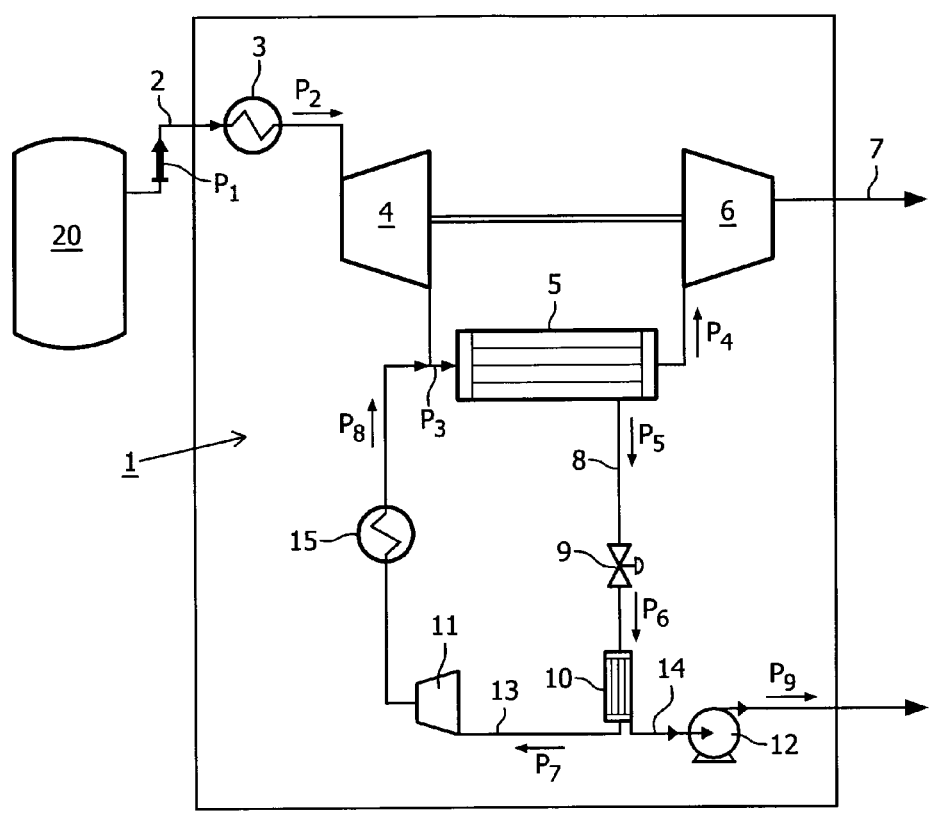
FIG. 1 shows a schematic view of a device according to the invention.

Referring to FIG. 1, a device 1 is shown for cleaning a contaminated gas such as for instance natural gas, in which device 1 the method according to the invention can be performed. The contaminated gas is supplied as according to arrow $P_1$ by a feed 2 under a pressure of between 50 and 150 Bar (usually a typical pressure of about 90 Bar) and at a temperature of for instance more than 100° C. The gas may be pre-treated in pre-treatment unit 20, if desired. The gas supplied as according to arrow $P_1$ is then cooled in a heat exchanger 3, for instance, by means of cooling into the atmosphere. The cooling will typically be such that the natural gas is brought to a temperature which is lower than the critical temperature thereof, for instance, to the temperature $T_1$ indicated in FIG. 2. The gas is preferably cooled to temperature $T_1$ at almost constant pressure. At temperature $T_1$ the gas is in the liquid phase. A suitable temperature $T_1$ is for instance around −60° C. The thus cooled liquid flows from heat exchanger 3 as according to arrow $P_2$ to an expander 4. The liquid supplied as according to arrow $P_2$ is expanded by means of expander 4, preferably in isentropic manner, to a lower pressure, which is relatively close to the intersection 150 and below the liquid line 110, for instance between 25 and 45 Bar (see FIG. 2). This isentropic pressure and temperature decrease is indicated in FIG. 2 by means of broken line 130. As a result of the sudden fall in pressure the temperature of the liquid will fall back to a final temperature $T_2$ (and a corresponding final pressure $P_2$) such that a part of the fractions present in the liquid changes phase. According to the invention, the final pressure ($P_2$) and temperature ($T_2$) of target point 160 are preferably relatively close to the pressure and temperature of the intersection 150. Preferably the temperature is within a range of ±50° C. from the temperature corresponding to the intersection 150, while the pressure is preferably within a range of ±20 bar from the pressure corresponding to the intersection 150. More particularly, at least a part of the main constituent $CH_4$ present in the liquid natural gas will enter the gaseous phase due to the expansion. When reaching target point 160 from a temperature $T_1$ below the critical point 140, a liquid mixture comprising gas bubbles is reached. It is also possible however to cool (and/or expand) to target point 160 from a temperature above the critical point 140. In such a case, a gas is obtained comprising liquid bubbles. By selecting the target point 160 such that it is below the liquid line 110 of the phase diagram and relatively close to the intersection 150 between the solid line 120 and the liquid line 110, the methane vapor fraction in the liquid/gas mixture is maximized. The contaminating fractions of $CO_2$ and $H_2S$ remain in the liquid phase. As a result a medium mixture is created with a liquid matrix incorporating gas bubbles. This medium mixture is supplied according to arrow $P_3$ to first rotating means in the form of a rotating assembly of feed channels 5. The liquid/gas bubble mixture is carried through the channels of the rotor 5 whereby, as a result of the rotation of rotor 5, the gas bubbles condense against the sides of the feed channels. The condensed methane gas bubbles leave rotor 5 on the side remote from expander valve 4 and are discharged as first fraction according to arrow $P_4$ as cleaned gas. If desired, the first fraction may then be further purified by conventional means, such as by amine treatment. Compressor 6 may be used to bring the gas in the liquid phase. The methane fraction discharged as first fraction 7 comprises a typical concentration of between 86 mol % and 96 mol % of methane.

According to the invention, the contaminated liquid phase, which consists substantially of liquid $CO_2$ and $H_2S$ with some methane gas therein, is discharged according to arrow $P_5$ as second fraction 8, optionally cooled in a heat exchanger (not shown), and expanded by means of throttle valve 9. As a result, a second fraction is created with a liquid matrix incorporating methane gas bubbles. The phase diagram of this second fraction is also shown in FIG. 2 as curve 210. Please note that this phase diagram differs from the phase diagram of the original mixture since the relative amounts of $CH_4$ and $CO_2$ differ. For a 50/50 mixture of $CO_2/CH_4$ for instance, the second fraction would typically be a 80/20 mixture of $CO_2/CH_4$. This medium mixture is supplied according to arrow $P_6$ to second rotating means in the form of a rotating assembly of feed channels 10. The second fraction is preferably cooled and/or expanded to a final pressure and temperature such that the target point 260 is relatively close to the liquid line 210 of the second fraction phase diagram, as exemplified in FIG. 2 by a plurality of preferred target points 260. Preferably the pressure is within a range of ±20 bar from the pressure corresponding to the liquid line 210, more preferably within a range of ±10 bar.

The liquid/gas bubble mixture is carried through the channels of the rotor 10; whereby, as a result of the rotation of rotor 10, the gas bubbles condense against the sides of the feed channels. The condensed methane gas bubbles leave rotor 10 on the side remote from throttle valve 9 and are discharged as a third fraction 13, according to arrow $P_7$. Compressor 11, and optionally heating means (not shown), may be used to bring the methane gas to the liquid phase, or at least in conditions which correspond to the inlet conditions for the first rotating means 5. According to the invention, the third fraction 13 is re-fed according to arrow $P_8$ to the first rotating means 5, optionally after having been cooled in a heat exchanger 15. According to the invention, the contaminated liquid phase, which consists substantially of liquid $CO_2$ and $H_2S$ with a very small amount of methane gas therein (typically less than 1 mol %), is discharged according to arrow $P_9$ as fourth fraction 14 by means of activating a pump 12.

Referring to FIG. 2, it is also possible according to the invention to cool and expand the gas mixture to a target point 170, having a pressure $P_3$ and a temperature $T_3$, such that the gas is in the liquid phase and at least one fraction is in the solid phase. For a typical natural gas containing a $CH_4/CO_2/H_2S$ mixture, the temperature $T_3$ will for instance be around −65° C. and the pressure around 40 bar. In this embodiment the second fraction will also comprise solid $CO_2$ particles. These are then separated in the second rotating means 10 for the liquid $H_2S$ and gaseous $CH_4$ fractions.

The method according to the invention can be used for many applications. Any separation of hydrocarbons can in principle form the subject matter of the invented method; wherein, the fractions for separating preferably differ in vapor point. It is thus possible to apply the method for the purpose of purifying natural gas, as has been described at length above. It is also possible to apply the method for cracking naphtha; wherein, the above described device can be used as substitute for the usual distillation column. It is also possible to apply the method to separate and purify polyolefins and other polymers. Particularly preferred is to apply the method and device for enrichment of air, i.e. purifying air by augmenting the amount of oxygen in air at the expense of the amount of nitrogen. Such an oxygen-enriched air can be used advantageously as feed in burning installations. Since the amount of oxygen in the purified feed is high, the amount of $CO_2$ in the burned mixture will also be high, which facilitates separation thereof. Other preferred applications of the method and device of the invention comprise separating the wet components out of natural gas, in particular separating pentane from methane; separating $CO_2$ from coal conversion processes; separating $CO_2$ from $N_2$; and separating $CO_2$ from $H_2$.

The invention claimed is:

1. A device for separating a flowing medium mixture into at least two fractions with differing mass densities,
   the device comprising an inlet for the flowing medium mixture to be separated,
   which connects to a first rotating means for rotating the flowing medium mixture such that it separates into at least a first and a second fraction,
   said first rotating means connecting to a first and a second outlet means for discharging the first and second fractions,
   wherein the device further comprises a feedback loop comprising a second rotating means between the second outlet means and the inlet means which connects to the first rotating means,
   wherein the device further comprises a first means for physically influencing the difference in mass densities of the fractions to be separated, the first means connecting upstream in a flow direction of the flowing medium mixture to the first rotating means and comprising active or passive cooling means, disposed upstream of an expansion means in the flow direction of the flowing medium mixture.

2. The device as claimed in claim 1, wherein the device comprises a second means for physically influencing the difference in mass density of the fractions to be separated, the second means connecting downstream in the medium flow direction to the first separating means, and upstream in a medium flow direction to the second separating means.

3. The device as claimed in claim 1, wherein at least one of the first and second rotating means comprise a rotating assembly of feed channels.

4. The device as claimed in claim 1, wherein at least one of the first and second rotating means comprise a cyclone.

5. The device as claimed in claim 1, wherein the means influencing the difference in mass density comprise expansion or compression means.

6. The device as claimed in claim 1, wherein the means influencing the difference in mass density comprise cooling or heating means.

7. A method for separating a flowing medium mixture into at least two fractions with differing mass densities, comprising the steps of:
   A) supplying a flowing medium mixture to be separated in fractions,
   B) treating the flowing medium mixture in a first rotating means, such that it rotates and separates in at least a first fraction and a second fraction,
   C) discharging at least the first and the second fractions,
   D) treating the second fraction in a second rotating means, such that it separates into at least a third fraction and a fourth fraction,
   E) discharging at least the third and the fourth fractions,
   F) supplying the third fraction to the first separating means, and
   G) repeating at least steps B) and C), wherein step B) comprises physically increasing the difference in mass densities of the fractions to be separated in the flowing medium mixture, prior to causing separation thereof by cooling the mixture followed by expanding the mixture.

8. The method as claimed in claim 7, wherein step D) comprises physically increasing the difference in mass density of the fractions to be separated in the second fraction, prior to causing separation thereof.

9. The method as claimed in claim 7, wherein step D) comprises causing at least one of the flowing medium mixture and the second fraction to rotate in a rotating assembly of feed channels.

10. The method as claimed in claim 7, wherein step D) comprises causing at least one of the flowing medium mixture and the second fraction to rotate in a cyclone.

11. The method as claimed in claim 7, wherein the difference in mass density of the fractions of at least one of the mixture for separating and the second fraction is increased by causing the mixture to expand.

12. The method as claimed in claim 7, wherein at least one of the mixture to be separated and the second fraction is cooled before causing rotation thereof.

13. The method as claimed in claim 12, wherein treating the medium mixture in step B) involves bringing the medium mixture to a pressure and a temperature, which together define a target point in the diagram of the medium mixture, with the proviso that the target point is below the liquid line of the phase diagram and relatively close to the intersection between the solid and the liquid line.

14. The method as claimed in claim 13, wherein the target point does not deviate more than 50° C. and more than 20 bar from the intersection between the solid and the liquid line.

15. The method as claimed in claim 13, wherein the target point is on the right of the solid line.

16. The method as claimed in claim 13, wherein the target point is on the left of the solid line.

17. The method as claimed in claim 7, wherein the expansion is performed either adiabatically, isentropically or isenthalpically.

18. The device as claimed in claim 1, wherein the second means for influencing mass densities comprise active or passive cooling means, disposed upstream of expansion means in the flow direction of the medium.

19. The method as claimed in claim 8, wherein the step of physically increasing the difference in mass densities of the fractions to be separated in the second fraction, prior to causing separation thereof comprises cooling the mixture followed by expanding the mixture.

* * * * *